United States Patent [19]

Johnson

[11] 4,455,400

[45] Jun. 19, 1984

[54] MIGRATIN-FREE SIZE FOR GLASS FIBERS

[75] Inventor: Carl A. Johnson, Granville, Ohio

[73] Assignee: Owens-Corning Fiberglas Corporation, Toledo, Ohio

[21] Appl. No.: 162,854

[22] Filed: Jun. 25, 1980

Related U.S. Application Data

[63] Continuation of Ser. No. 946,904, Sep. 28, 1978, abandoned.

[51] Int. Cl.$^3$ ..................... C08L 67/00; C08L 63/00
[52] U.S. Cl. ..................... 523/454; 523/455; 523/456; 523/461; 524/210; 524/261; 524/308; 524/356; 524/378; 524/581; 524/601
[58] Field of Search ............... 523/454, 456, 455, 461; 524/210, 261, 308, 378, 356, 581, 601

[56] References Cited

U.S. PATENT DOCUMENTS

| | | | |
|---|---|---|---|
| 2,272,588 | 2/1942 | Simison | 156/167 |
| 2,323,684 | 7/1943 | Simison | 428/392 |
| 2,491,889 | 12/1949 | Bennett et al. | 65/3.1 |
| 2,723,215 | 11/1955 | Biefeld et al. | 428/392 |
| 2,939,761 | 6/1960 | Stein | 427/302 |
| 3,154,908 | 11/1964 | Cilker et al. | 65/3.44 |
| 3,276,853 | 10/1966 | Eakins | 427/255 |
| 3,323,941 | 6/1967 | Van Dijk | 65/3.43 |
| 3,473,950 | 10/1969 | Wong | 428/378 |
| 3,493,425 | 2/1970 | Campbell | 428/391 |
| 3,556,754 | 1/1971 | Marsden et al. | 65/3 |
| 3,622,290 | 11/1968 | Klink et al. | 65/3 |
| 3,783,001 | 1/1974 | Marzocchi | 428/378 |
| 3,850,872 | 11/1974 | Marzocchi | 260/37 EP |
| 3,888,645 | 6/1975 | Marzocchi | 428/378 |
| 3,922,466 | 11/1975 | Bell et al. | 428/388 |
| 3,934,068 | 1/1976 | Foley et al. | 428/378 |
| 4,056,651 | 11/1977 | Scola | 428/378 |

OTHER PUBLICATIONS

Gleeson; Determination of the Effect on the Strength of Glass Strand of Spraying an Epoxide Resin onto the Filaments at the Bushing: *Plastics & Polymers*, Feb. 1969, Great Britain.

*Primary Examiner*—Lewis T. Jacobs
*Attorney, Agent, or Firm*—Ronald C. Hudgens; Philip R. Cloutier; James B. Wilkens

[57] ABSTRACT

A migration-free size for glass fibers which includes a silane coupler, lubricant and film former and is characterized by the absence of a carrier, either aqueous or organic. To provide required shelf-life, a volatile agent such as acetone is added in limited amount to block coupler-film former reaction pending use of the size.

4 Claims, 1 Drawing Figure

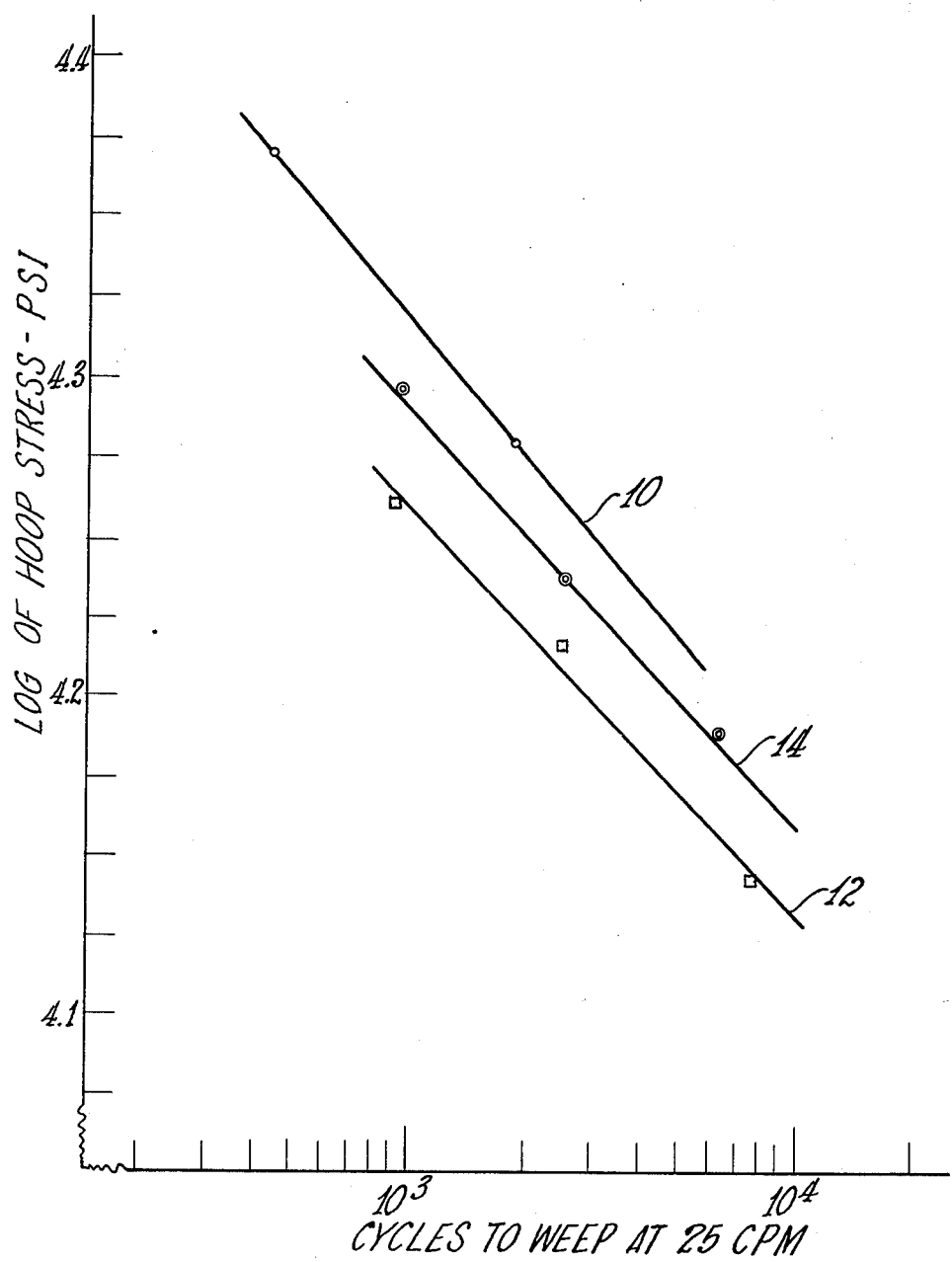

MIGRATIN-FREE SIZE FOR GLASS FIBERS

This application is a continuation of my copending application Ser. No. 946,904 filed Sept. 28, 1978, and now abandoned.

BACKGROUND

Glass fibers are now produced for use in a broad variety of technologies. Their production involves a procedure wherein molten glass is passed through a multiple orificed bushing at a relatively high rate. As the very small nascent glass streams extend from the bushing, they encounter a "prepad" or cooling stage usually provided as a water spray. The cooled and now rigidified "filaments" then encounter a "pad" or size applicator at which point they are coated with a protective film, following which the coated filaments are brought together at a "gathering shoe" to form a "strand". This strand is coiled upon a spool to form a "package". During formation of the package, the strand is traversed back and forth across the spool by a spooling cam driven device or the like, often referred to as a traverse. The spool is rotated at a collet or winder and the tension exerted upon the strand by the winding activity serves to attenuate the molten stream of glass passing immediately from the bushing.

The above-described sizing procedure is highly important to the successful production of strand as well as to the formation of the great variety of products utilizing glass fibers. In this respect, when considered in isolation, glass filaments have a relatively high theoretical strength. However, in the course of their formation to strand and subsequent glass fiber products, such strength is not realized, due at least in part to minute defects developed upon filament surfaces occasioned by glass on glass abrasion during production. A highly important function of the sizing procedure therefore, is to impart a desired degree of lubricity to the filaments, thus lessening this abrading phenomena. Filament degradation further may be influenced by the water content of sizes with which they are coated, the most conventional of sizes being provided as aqueous solutions or emulsions. See in this regard, U.S. Pat. No. 3,473,950.

Another important function of the size coating stems from the nature of the glass filament surfaces. These surfaces are very smooth and are highly hydrophilic in nature. In consequence, a thin film of water tends to form upon the filament surfaces functioning to disrupt any bond, chemical or physical, which would otherwise be formed between the glass and the material within which it may be embedded. Accordingly, in addition to the above described lubricant, the size generally will incorporate a coupling agent serving to react both with the silica in the glass as well as with organic matrix material within which the filaments and strands usually are embedded. As is apparent, the selection of coupling agent looks to the ultimately intended use of the fiber, a compatible coupling agent of one variety being utilized with elastomers and the like, while that of another variety being utilized with glass fiber reinforced resinous articles and the like.

Film formers provide the final principal active ingredient of the sizes and are selected as resins of relatively higher molecular weight, for example epoxy resins and the like. The film formers serve in effect to provide a tougher film coating which, for many applications of the glass fibers, imparts a necessary integrity or character to strand. For example, where the strand is utilized as roving for weaving glass fiber reinforcing sheets and the like, a certain stiffness is required of the product to permit its manipulation by the ultimate user in connection with placement within molds and the like. The strand stiffness translates into the woven integrity of the cloth to permit its facile manipulation. Of course, the selection of the stiffness quality must be such as to derive adequate cloth integrity while still permitting manipulation of the cloth about the corners of a mold or the like within or upon which it is utilized.

In general practice, the coupling agent, lubricant and film former are applied to the glass filaments utilizing the media of a water carrier. In this regard, the combined "solid" ingredients represent about 5% by weight of the liquid size which is continuously recirculated at the applicator stage from a supply reservoir. Following application of the size, the formation of strands and development of a package as above described, the package is then moved to a drying oven at which point the aqueous or volatile carrier phase of the size is driven off.

To avoid the possibility of attack upon the glass surfaces by the aqueous phase of the sizes, investigators have developed organic carriers or non-aqueous polar solvents as carriers, for example as described in U.S. Pat. No. 3,473,950. Generally, the steps in producing filaments using such sizes follow that described, including the step of heating the completed packages to drive off the volatile organic carrier. In all systems, the carrier represents the major component of the size solution, the solids or coupling agent, lubricant and film formers representing, as noted, about 5% by weight of the material.

A principal difficulty encountered by industry in the utilization of sizes resides in a phenomenon termed "migration". As noted above, the liquid carrier phase of the size is driven off by depositing the strand package in an oven. Inasmuch as these packages typically are cylindrical in form, being wound upon a cardboard collar, the vaporization of the liquid phase takes place somewhat differentially or progressively from the outside and inside faced surfaces as well as the edge surfaces toward the central portion of the package. As the carrier, i.e. volatile constituent, is removed to a point wherein a total 10 to 12 percent moisture content for the package is present, it is opined that migration of the internally disposed carrier toward the outward surfaces commences by capillary action. This causes a movement of the solids component of the size from the position of its initial deposition toward the surface of the package. Such movement of important constituents may result in the development of randomly located regions of the filaments exhibiting an inadequate size coating. Further, there develops an excess accumulation of these important constituents at the externally exposed surfaces of the package.

As indicated earlier, as strand is wound to form a package, it is manipulated in a back and forth fashion through the use of a traverse. Such spool winding teachniques necessarily provide for spaced "turn around" points along the length of each strand. These points represent the strand position at the opposed edges of the cylindrical package wherein the traverse reverses direction of strand. In the course of the above-described migration of liquid carrier and concurrent movement of the important size constituents toward the outer edge of the package, a build-up of the latter constitutents is evidenced at the outer edge surfaces and this build-up then is witnessed as a series of spaced material build-ups in the strand as it is unwound from the package. When the strand is subsequently drawn from the package and woven to form cloth products and the like, the dispersed turn around points with excess size material become visible and represent an undesirable aspect of the resultant woven product. This particularly is true where drying is carried out in conventional fashion within direct gas fired ovens. Where such drying is utilized, the materials of combustion tend to alter the color of the cationic materials usually incorporated within the size. This spotted discoloration tends to derogate from the quality of the resultant product.

As is apparent, the removal of solid size materials due to migration results in dispersed sites of filament surface area having less size. The thus exposed surface areas may exhibit lowered strength characteristics resulting in dispersed filament breakage which may result in undesired "fuzz" formation. Where the sized strand is intended for application as reinforcement within elastomeric product such as pneumatic tires, driving belts, timing belts and the like, it initially is coated with an impregnant. This impregnant serves the purpose of locking the strands within the elastomer and may have a variety of formulations as described, for example, in U.S. Pat. No. 3,850,872. Inasmuch as the impregnant fails to adhere to regions of the fibers which exhibit an excess coating of size, the quality of anchoring of the strands within the elastomer is adversely affected where materials are utilized evidencing the migration effects. Such condition of the impregnant coated strands is generally referred to in the industry as "streaking".

In addition to the pronounced effects of migration in the course of oven drying of the strand packages, the phenomenon also has been observed to commence early in the process of strand formation. For example, migration due to evaporation has been found to occur as strand packages are maintained in holding or surge areas prior to their introduction to the heating step. This migration is caused by the evaporation of the outer surfaces of the package during that holding interval.

The term "glass fibers", as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass molting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strand, yarn, cord and fabrics formed thereof.

SUMMARY OF THE INVENTION

The present invention is addressed to a size preparation and treatment for glass fibers which achieves a substantial avoidance of migration phenomena. When formulated in accordance with the invention, the sizes are applied in the absence of a carrier, either aqueous or organic. In consequence, the otherwise necessary drying procedures driving off carrier are substantially avoided to eliminate the principal contributive factor to size migration.

As another aspect and object of the invention, it has been discovered that a non-migrating size may be formulated incorporating the principal functional coupling agent, lubricant and film former components of a conventional size in the absence of liquid carrier but with a volatile liquid blocking agent which significantly enhances the shelf life thereof. By so limiting the amount of this blocking agent to about eight percent by weight or less, the volatile constituent subsequently may be driven off by vaporization in the course of strand formation and over a subsequent relatively short heat drying interval. When so driven off, the reaction of coupling agent and film former is permitted to occur, while capillary movement is avoided to, in turn, avoid any migratory movement of the now reacted size components.

As another feature of the invention, it has been discovered that the quantity of size material required to effect a full coating thereof upon glass filaments is significantly reduced as compared to conventional, carrier born sizes. This significant volumetric reduction readily is translatable to lowered energy requirements and production costs.

A further object of the invention is the provision of a new and improved method of coating glass fibers, and particularly glass fibers at forming, wherein the coating material is provided in the absence of an aqueous or organic carrier.

Further objects and advantages of the invention will become apparent to those skilled in the art to which it relates from the following description of the preferred embodiments.

BRIEF DESCRIPTION OF THE DRAWINGS

The single FIGURE is a collection of regression curves showing the hoop stress performance of pipe samples formed with conventionally sized glass fiber as well as pipes formed with glass fiber sized according to the invention.

DETAILED DESCRIPTION

As indicated above, the selection of precise size formulations will be dependent upon the ultimate application or use contemplated for the sized glass fibers. The size applied will incorporate at least a lubricant component to which may be added coupler, film forming components and optionally dyes and/or anti-static agents. Of particular importance, these components are provided in the absence of carrier, either aqueous or organic, a component typically representing the major ingredient of size formulations heretofore employed. Where film former and coupler are included, it is preferred to incorporate a volatile blocking agent in an amount less than about eight percent by weight which, while present within the size, serves to stabilize it by blocking coupler-film former reaction. A considerably improved shelf life for the size is achieved with the blocking agent present therein. The agent is removed to a great extent in the course of package formation, the minor remainder being removed by heating a completed package within an oven. During this heating stage, the volatile blocking agent, by virtue of the controlled amounts thereof within the size formulation, is fully removed from the strand package essentially entirely by a vaporization activity. Such activity, as opposed to capillary movement, is found not to cause the important size components to be driven or migrate toward the surface of the strand package. Of course, where the end utilization permits low moisture processing into an impregnation bath or chop process, no oven drying is required.

In the discourse to follow, various size formulations prepared according to the invention are described initially, following which the discussion turns to tests for certain size systems intended for specific applications, i.e. for use with glass fibers used in woven roving, or suited for embedding within resin structures of a broad variety.

Generally, the size applied will incorporate a lubricant component to which is added a coupler, film forming components and, optionally, dyes and anti-static agents. These components are provided in the substantial absence of carrier, either aqueous or organic. As a consequence of the resultant lower volumes of size utilized, the volatile constituents present on the glass filaments are substantially volatilized prior to package formation. Certain film formers and couplers of size formulations have a tendency to exhibit limited shelf lives; thus, where storage is contemplated, the invention provides for the incorporation of a volatile blocking agent in an amount less than about eight percent by weight which, while present within the size formulation, does not act as a carrier but serves to stabilize the formulation by blocking the reaction of coupler with film former. Considerably improving the shelf life of size when present therein, such blocking agents are found to be quite useful in the most typically encountered production systems wherein size is batch mixed and utilized over a reasonably extended interval. However, where on-line facilities for formulating the size are provided, such blocking agents are not required.

In either approach utilized, the salient aspect of the invention resides in a successful application of effective size without resort to a volatile liquid carrier per se which must be driven off as a subsequent production step, a step which results in unwanted migration phenomena of the solids component of the size. Where a volatile blocking agent formulation is utilized in accordance with the invention, the amount thereof is limited as above indicated to an extent wherein a substantial amount thereof is volatilized in the course of filament and strand formation prior to its reaching the packaging spool. When the resultant package is oven dried, the moisture content thereof is about one to two percent by weight and capillary action causing material solids migration will not be present, the remaining agent and any other volatiles being removed through the mechanism of elementary vaporization.

In addition to the highly advantageous nonmigratory characteristics of the carrier-free size formulations of the invention, other process advantages will be found to accrue through its use, one being that the physical volume of size required in the glass fiber production process is greatly diminished. For example, industrially accepted size formed having about a five percent solids component and the remainder being an aqueous carrier will require application of about 480 gallons thereof at ten typical bushing positions over a 24-hour interval. Similarly, thixotropic size materials will incorporate about 3.5 percent solids and will require application of about 200 gallons over a 24-hour interval for ten bushing positions. Compared with the above, a typical formulation according to the invention, having substantially no carrier, will adequately coat the glass fibers utilizing only a ten-gallon supply over the noted 24 hours at ten positions of application. The lower volumes required for the sizing process permit faster mixing, easier clean-up as well as the elimination of closed loop systems wherein nonapplied carrier-size formulation is returned to the supply receptacle. Of course, inasmuch as no aqueous or organic carriers are present within the formulations of the invention, economies are realized through the substantial elimination of thermal energy otherwise required in oven drying. Further, the lower volumes involved lessen "sling-off" of size product from moving strands otherwise leading to pollution problems. The lower quantities of size involved play a roll in permitting the substantial removal of volatile constituents prior to the filaments reaching the packaging spool.

As indicated earlier, the particular formulation of carrier-free size in accordance with the invention will depend upon the contemplated ultimate utilization of the coated glass fibers. Of these end uses, the size criteria associated with "weavers" roving applications may be deemed more technically demanding. Accordingly, formulations and the testing thereof with respect to that end use are addressed with more emphasis in the description to follow.

Looking to the principal components of size formulations, conventional size lubricants will include such materials as amine salts, animal and vegetable oils, silicone lubricants, the condensates of amines and fatty acids such as octadecyl amine acetate, polyethylene glycols and their esters and polypropylene glycols. Lubricant selection also will be made in conjunction with the integrity or relative stiffness of the strand as is desired by the operator. Of course, other factors, including the selection of film former, are associated with this stiffness characteristic.

The couplers utilized in connection with sizing operations usually are silanes or organosilanes. The organosilane may be defined as a silane having one or more alkyl, aryl, aryl-alkyl or alkyl-aryl group thereon which group includes a functional radical which contains an oxirane ring or that is reactive with a curing agent for an oxirane ring. Organosilicon compounds which are characterized by at least one organo group that includes an amino, epoxy, hydroxyl, chloro or thiol radical are suitable, as well as mixtures of two or more types of these compounds having different radicals. Suitable groups include: gamma amino propyl, N-methyl gamma amino propyl, N-phenyl gamma amino propyl, N,N-methyl gamma amino propyl, N-alkyl gamma amino propyl, N-beta (aminoethyl) gamma amino propyl, amino phenyl, the acrylic salt of N-beta (amino ethyl) gamma amino propyl, gamma methacryloxy, propyl, gamma glycidoxy propyl, beta (3,4 epoxy cyclohexyl) ethyl, beta (3,4 epoxy 4 methyl cyclohexyl) ethyl, 2 propyl-9,10 epoxystearate, copolymer of 1 part vinyl silane and 2 parts glycidyl methacrylate, copolymer of 2 parts vinyl silane and 1 part glycidyl methacrylate, 2:1 vinyl silane, gamma (2 hydroxy phenyl) propyl, gamma (4 hydroxyl phenyl) propyl, formal derivative of gamma (3,4 dehydroxy phenyl) propyl, gamma hydroxyl propyl, gamma thiol propyl, amino biphenyl, benzimadzole substituted groups, alkyl cycloalkyl epoxides, cycloalkyl alkyl epoxides, alkyl epoxides, alkyl aryl epoxides, aryl alkyl epoxides, etc.

The film former component of the size formulations particularly is selected with respect to intended end use.

These film formers accordingly will be selected from a broad variety of compounds. Typically, epoxy resins are utilized, for example, aliphatic and bisphenol A epoxy-based formulations. Alternately, polyester and polybutadiene formulations will be selected for elastomeric end use applications. Typical film former components will be revealed in the exemplary material to follow.

By using the above principal size components in the absence of an aqueous carrier, the physical, bulk quantity of size applied is reduced. Of the size thus applied, that moisture remaining on the fiber from the pre-pad cooling stage will hydrolyze silane coupling agents and those alcohol constituents will substantially vaporize as well as remaining moisture during the forming stages prior to reaching the packaging spool. Similarly, the blocking agent, such as acetone, will volatilize considerably in the forming process and the overall effect is the production of a strand package exhibiting a one to two percent by weight volatile constituent content. No solids migration occurs upon subsequent oven drying.

The following examples demonstrate the practice of the invention wherein aliphatic epoxy film former formulations are provided. In these examples and the examples to follow, the amounts indicated are expressed in parts by weight:

| | Parts By Weight (P.B.W.) |
|---|---|
| EXAMPLE 1 | |
| Oleic acid | 42 |
| Cycloaliphatic epoxy (ERL 4221)[1] | 42 |
| Gamma-Methacryloxy-Propyl Triethoxy Silane (A174)[2] | 16 |
| EXAMPLE 2 | |
| Oleic acid | 21 |
| Cycloaliphatic epoxy (ERL, 4221)[1] | 63 |
| Gamma-Methacryloxy-Propyl Triethoxy Silane (A174)[2] | 16 |
| EXAMPLE 3 | |
| Polyethylene glycol 400 Monooleate | 42 |
| Cycloaliphatic epoxy (ERL 4221)[1] | 42 |
| Triethoxy Silane (A174)[2] | 16 |

The following examples demonstrate size formulations according to the invention wherein polyester or polybutadiene compositions are incorporated as film former:

| | P.B.W. |
|---|---|
| EXAMPLE 4 | |
| Diallyl phthalate | 24 |
| E720[3] | 26 |
| Oleyl alcohol reacted with 5 moles of ethylene oxide | 25 |
| Benzoyl peroxide | 1 |
| Triethoxy Silane (A174)[2] | 25 |
| EXAMPLE 5 | |
| Triethoxy Silane (A174)[2] | 32 |
| E400[4] | 30 |
| Polyethylene glycol 400 Monooleate | 32 |
| Amino silane (A1100)[5] | 8 |
| EXAMPLE 6 | |
| Gamma-Methacryloxy-Propyl Triethoxy Silane (A174)[2] | 17 |
| Amino Silane (A1100)[5] | 8 |
| Polybutadiene (45H)[6] | 50 |
| Pentaerythritol fatty acid esters (Hercolube J15)[7] | 25 |
| EXAMPLE 7 | |
| Oleyl alcohol reacted with 5 moles of ethylene oxide | 25 |
| Gamma-Methacryloxy-Propyl Triethoxy Silane (A174)[2] | 17 |
| Amino Silane (A1100)[5] | 8 |
| Polybutadiene | 50 |

| | P.B.W. |
|---|---|
| EXAMPLE 8 | |
| Gamma-Methacryloxy-Propyl Triethoxy Silane (A174)[2] | 16 |
| Polyethylene glycol 400 Monooleate | 16 |
| Amino Silane (A1100)[5] | 8 |
| E400[4] | 60 |
| EXAMPLE 9 | |
| Gamma-Methacryloxy-Propyl Triethoxy Silane (A174)[2] | 16 |
| Polyethylene glycol 400 Monooleate | 8 |
| Amino Silane (A1100)[5] | 8 |
| E500[8] | 60 |

The following formulations are provided having a bisphenol A type epoxy film former component:

| | |
|---|---|
| EXAMPLE 10 | |
| Epoxy resin (DER 330)[9] | 64 |
| Polyethylene glycol 400 Monooleate | 9 |
| Polethyleneimine | 1 |
| Gamma-Methacryloxy-Propyl Triethoxy Silane (A174)[2] | 17 |
| Amino Silane (A1100)[5] | 9 |
| EXAMPLE 11 | |
| Epoxy resin (DER 330)[9] | 60.0 |
| Polethylene glycol 400 Monooleate | 8.4 |
| Polethyleneimine | 0.9 |
| Gamma-Methacryloxy-Propyl Triethoxy Silane (A174)[2] | 16.0 |
| Amino Silane (A1100)[5] | 8.4 |
| Acetic Acid | 6.7 |
| EXAMPLE 12 | |
| Epoxy resin (DER 330)[9] | 61.8 |
| Polethyleneimine | 0.9 |
| Gamma-Methacryloxy-Propyl Triethoxy Silane (A174)[2] | 16.5 |
| Amino Silane (A1100) | 8.7 |
| Acetone | 3.5 |
| Trylube 24/32[10] | 8.7 |
| EXAMPLE 13 | |
| Epoxy resin (DER 330)[9] | 41 |
| Gamma-Methacryloxy-Propyl Triethoxy Silane (A174)[2] | 16 |
| Amino Silane (A1100)[5] | 8 |
| Ciba 906[11] | 23 |
| Pluronic L101[12] | 4 |
| Pluronic P105[13] | 8 |
| EXAMPLE 14 | |
| Epoxy resin (DER 330)[9] | 41 |
| Gamma-Methacryloxy-Propyl Triethoxy Silane (A174)[2] | 16 |
| Trylube 24/32[10] | 10 |
| Ciba 906[11] | 25 |
| Diamino methoxy silane (Z6020)[14] | 8 |
| EXAMPLE 15 | |
| Epoxy resin (DER 330)[9] | 50 |
| Gamma-Methacryloxy-Propyl Triethoxy Silane (A174)[2] | 17 |
| Amino Silane (A1100)[5] | 8 |
| Acetone | 4 |
| Trylube 24/32[10] | 5 |
| Oleyl alcohol reacted with 5 moles of ethylene oxide | 15 |
| Versamid 140[15] | 5 |
| EXAMPLE 16 | |
| Epoxy resin (DER 330)[9] | 65 |
| Acetone | 6 |
| Versamid 140[15] | 10 |
| Gamma-Methacryloxy-Propyl Triethoxy Silane (A174)[2] | 17 |
| Amino Silane (A1100)[5] | 8 |
| EXAMPLE 17 | |
| Epoxy resin (DER 330)[9] | 74.3 |
| Z6071[16] | 14.3 |
| Dioctyl Phthlate | 11.4 |
| EXAMPLE 18 | |
| Epoxy resin (DER 330)[9] | 55 |
| Acetone | 4 |
| Versamid 140[15] | 10 |
| A151[17] | 20 |
| Trylube 24/32[10] | 5 |
| Oleyl alcohol reacted with 5 moles of ethlene oxide | 10 |
| EXAMPLE 19 | |
| Epoxy resin (DER 330)[9] | 45 |
| Acetone | 4 |
| Versamide 140[15] | 10 |
| Dioctyl Phthalate | 10 |
| A151[17] | 20 |
| Trylube 24/32[10] | 5 |
| Oleyl alcohol reacted with 5 moles of ethylene oxide | 10 |

| | P.B.W. |
|---|---|
| EXAMPLE 20 | |
| Epoxy resin (DER 337)[18] | 66 |
| Trylube 24/32[10] | 16 |
| Gamma-Methacryloxy-Propyl Triethoxy Silane (A174)[2] | 16 |
| Epoxy Silane (A187)[19] | 8 |
| EXAMPLE 21 | |
| Epoxy resin (DER 330)[9] | 45 |
| Shell Hardner H3[20] | 10 |
| Versamid 140[15] | 10 |
| A151[17] | 20 |
| Oleyl alcohol reacted with 5 moles of ethlene oxide | 10 |
| Trylube 24/32[10] | 5 |
| EXAMPLE 22 | |
| Epoxy resin (DER 330)[9] | 67 |
| Gamma-Methacryloxy-Propyl Triethoxy Silane (A174)[2] | 21 |
| Amino Silane (A1100)[5] | 4 |
| Oleyl alcohol reacted with 5 moles of ethylene oxide | 5 |
| Ethox CAM15[21] | 5 |
| Versamid 140[15] | 3 |
| Acetone | 3 |
| EXAMPLE 23 | |
| Epoxy resin (DER 330)[9] | 54.7 |
| Oleyl alcohol reacted with 5 moles of ethylene oxide | 14.2 |
| Ethox CAM15[21] | 1.9 |
| Gamma-Methacryloxy-Propyl Triethoxy Silane (A174)[2] | 16.0 |
| Amino Silane (A1100)[5] | 7.5 |
| Acetone | 5.7 |
| EXAMPLE 24 | |
| Epoxy resin (DER 330)[9] | 53 |
| Oleyl alcohol reacted with 5 moles of ethylene oxide | 10 |
| Trylube 24/32[10] | 5 |
| Versamid 140[15] | 7 |
| Gamma-Methacryloxy-Propyl Triethoxy Silane (A174)[2] | 17 |
| Amino Silane (A1100)[5] | 8 |
| Acetone | 5 |
| EXAMPLE 25 | |
| Epoxy resin (DER 330)[9] | 41 |
| Ciba 906[11] | 25 |
| Trylube 24/32[10] | 10 |
| Gamma-Methacryloxy-Propyl Triethoxy Silane (A174)[2] | 16 |
| Amino Silane (A1100)[5] | 8 |
| EXAMPLE 26 | |
| Epoxy resin (DER 330)[9] | 64 |
| Polyethylene glycol 400 Monooleate | 9 |
| Gamma-Methacryloxy-Propyl Triethoxy Silane (A174)[2] | 17 |
| Amino Silane (A1100)[5] | 9 |
| Polethyleneimine | 1 |
| EXAMPLE 27 | |
| Epoxy resin (DER 330)[9] | 60.0 |
| Ethox CAM15[21] | 2.5 |
| Oleyl alcohol reacted with 5 moles of ethylene oxide | 12.5 |
| Triethoxy Silane (A174)[2] | 19.0 |
| Amino Silane (A1100)[5] | 6.0 |
| Acetone | 3.0 |
| EXAMPLE 28 | |
| Epoxy resin (DER 330)[9] | 60.0 |
| Ethox CAM15[21] | 2.5 |
| Oleyl alcohol reacted with 5 moles of ethylene oxide | 12.5 |
| Triethoxy Silane (A174)[2] | 21.0 |
| Amino Silane (A1100)[5] | 4.0 |
| Acetone | 2.0 |
| EXAMPLE 29 | |
| Epoxy resin (DER 330)[9] | 60.0 |
| Ethox CAM15[21] | 2.5 |
| Oleyl alcohol reacted with 5 moles of ethylene oxide | 12.5 |
| Triethoxy Silane (A174)[2] | 23.0 |
| Amino Silane (A1100)[5] | 2.0 |
| Acetone | 1.0 |
| EXAMPLE 30 | |
| Epoxy resin (DER 330)[9] | 63.0 |
| Ethox CAM15[21] | 2.5 |
| Oleyl alcohol reacted with 5 moles of ethylene oxide | 12.5 |
| Triethoxy Silane (A174)[2] | 17.0 |
| Amino Silane (A1100)[5] | 5.0 |
| Acetone | 6.0 |
| EXAMPLE 31 | |
| Epoxy resin (DER 330)[9] | 63.0 |
| Ethox CAM15[21] | 2.5 |
| Oleyl alcohol reacted with 5 moles of ethylene oxide | 12.5 |
| Triethoxy Silane (A174)[2] | 17.0 |
| Amino Silane (A1100)[5] | 5.0 |
| Acetone | 6.0 |
| EXAMPLE 32 | |
| Epoxy resin (DER 330)[9] | 60.0 |
| Polyethyleneimine | 0.9 |
| Trylube 24/32[10] | 8.4 |
| Triethoxy Silane (A174)[2] | 16.0 |
| Amino Silane (A1100)[5] | 8.4 |
| EXAMPLE 33 | |
| Epoxy resin (DER 330)[9] | 60.0 |
| Polyethyleneimine | 0.9 |
| Acetic Acid | 6.7 |
| Trylube 24/32[10] | 8.4 |
| Triethoxy Silane (A174)[2] | 16.0 |
| Amino Silane (A1100)[5] | 8.4 |
| EXAMPLE 34 | |
| Epoxy resin (DER 330)[9] | 41 |
| Ciba 906[11] | 25 |
| Trylube 24/32[10] | 10 |
| Triethoxy Silane (A174)[2] | 16 |
| Diamino Methoxy Silane (Z6020)[22] | 8 |
| EXAMPLE 35 | |
| Epoxy resin (DER 330)[9] | 50 |
| Acetone | 4 |
| Trylube 24/32[10] | 5 |
| Versamid 140[15] | 5 |
| Oleyl alcohol reacted with 5 moles of ethylene oxide | 15 |
| Gamma-Methacryloxy-Propyl Triethoxy Silane (A174)[2] | 17 |
| Amino Silane (A1100)[5] | 8 |
| EXAMPLE 36 | |
| Epoxy Resin (DER 330)[9] | 50 |
| Acetone | 6 |
| Trylube 24/32[10] | 5 |
| Versamid 140[15] | 10 |
| Oleyl alcohol reacted with 5 moles of ethylene oxide | 10 |
| Gamma-Methacryloxy-Propyl Triethoxy Silane (A174)[2] | 17 |
| Amino Silane (A1100)[5] | 8 |
| EXAMPLE 37 | |
| Epoxy resin (DER 330)[9] | 65 |
| Acetone | 6 |
| Versamid 140[15] | 10 |
| Gamma-Methacryloxy-Propyl Triethoxy Silane (A174)[2] | 17 |
| Amino Silane (A1100)[5] | 8 |
| EXAMPLE 38 | |
| Epoxy resin (DER 330)[9] | 59.7 |
| Polethylene glycol 400 Monooleate | 8.4 |
| Gamma-Methacryloxy-Propyl Triethoxy Silane (A174)[2] | 15.9 |
| Amino Silane (A1100)[5] | 8.4 |
| Polyethyleneimine | 0.9 |
| | 6.7 |
| EXAMPLE 39 | |
| Epoxy resin (DER 332) | 65 |
| Polyethylene glycol 400 Monooleate | 9 |
| Gamma-Methacryloxy-Propyl Triethoxy Silane (A174)[2] | 17 |
| Amino Silane (A1100)[5] | 9 |
| EXAMPLE 40 | |
| Epoxy resin (DER 332)[23] | 63 |
| Polyethylene glycol 400 Monooleate | 19 |
| Gamma-Methacryloxy-Propyl Triethoxy Silane (A174)[2] | 12 |
| Amino Silane (A1100)[5] | 6 |
| EXAMPLE 41 | |
| Epoxy resin (DER 330)[9] | 64 |
| Igepal 630[24] | 8 |
| Trylube 7607[25] | 2 |
| Gamma-Methacryloxy-Propyl Triethoxy Silane (A174)[2] | 16 |
| Amino Silane (A1100)[5] | 6 |
| Acetone | 4 |
| EXAMPLE 42 | |
| Epoxy resin (DER 330)[9] | 61.3 |
| Igepal 630[24] | 7.7 |
| Trylube 7607[25] | 1.9 |
| Gamma-Methacryloxy-Propyl Triethoxy Silane (A174)[2] | 15.3 |
| Amino Silane (A1100)[5] | 5.7 |
| Diacetone alcohol | 8.0 |

Generally, the coupler component of the size formulation will be present in an amount between about 5–30 percent by weight, the lubricant will be present in an amount between about 10–65 percent by weight, and the film former will be present in an amount between about 10–70 percent by weight. A typical procedure utilized in preparing those sizes incorporating a blocking agent, e.g. acetone, provides for the separate mixing of blocking agent with coupling agent, e.g. amino silane, as well as the separate mixing of the remaining film former and lubricant components. The resultant two mixtures then are added together with moderate agitation. The blocking agent will be present in an amount corresponding with the amino silane coupler content and will generally be present in an amount less than about eight percent by weight.

Glass fiber packages having been treated with size in accordance with the invention wherein no aqueous or organic fluid carrier per se is utilized and the volatile blocking constituent of the size formulations is held below about eight percent by weight, when formed into packages, have exhibited essentially no migratory effects. Some migration may be developed due to the centrifugal action of the winding of the strand, however, such effects are dismissable in extent. While migratory effects can be physically observed at the surface of strand packages, the data set forth in Tables 1 and 2 demonstrate the essential uniformity of size application from the inside to the outside of a strand package following the treatment of the fibers thereof with the sizes identified above as Example 40, 41 and 42. The technique developing the data is one wherein successive equal quantities of the strand are removed from the passage commencing with the inside thereof and each quantity is subjected to a loss on ignition (LOI) evaluation. To provide the package utilized in connection with Table 1, the sizes were applied to glass fibers using a roll-type applicator, following which the fibers were grouped together into a strand and the strand was wrapped upon a revolving mandrel to produce the package. Commencing with the innermost portion of the package, successive 900 gram lengths (Table 1) of the strand or successive pounds of strand (Table 2) were removed and the amount of size upon a predetermined quantity thereof determined by placing the samples in a muffle furnace at about 1200° F. for 20 minutes to burn the coating therefrom. The ignition loss percent (LOI) then was calculated by comparing the weight of the skein before and after burning. A demonstration of the lack of migration in the package is shown in Tables 1 and 2 by virtue of the relative consistent LOI percentages from the inside to the outside of the package. A comparison of the above with typical migratory effects encountered with other sizes, for example, a conventionally utilized water-carried size, may be provided by comparing the computed ratio of the "outside" LOI values with respect to the nominal LOI values at the center of the package evaluated. These "migration ratios" for sizes incorporating aqueous carrier (95% by weight carrier) range in value from about four to six. As evidenced by Tables 1 and 2, the migration ratios developed utilizing size formulation according to the invention remain very close to desired unity. The parallel tensile and knot tensile data given in Table 1 show that the individual glass fibers within the evaluated package exhibit industrially acceptable strengths under a conventional test technique therein parallel disposed fibers are stressed to breakage with and without a simple forehand knot formed therein.

TABLE 1

| WEIGHT OF PACKAGE GMS | LOI % | PARALLEL* TENSILE | KNOT* TENSILE |
|---|---|---|---|
| 14,760 (Inside) | .55 | 129 | 37 |
| 13,860 | .56 | 122 | 37 |
| 12,960 | .63 | 116 | 39 |
| 12,060 | .57 | 116 | 39 |
| 11,160 | .54 | 117 | 41 |
| 10,260 | .62 | 123 | 37 |
| 9,360 | .60 | 113 | 38 |
| 8,460 | .60 | 102 | 38 |
| 7,560 | .55 | 111 | 39 |
| 6,660 | .52 | 106 | 40 |
| 5,760 | .59 | 130 | 35 |
| 4,860 | .52 | 127 | 43 |
| 3,960 | .66 | 110 | 35 |
| 3,060 | .42 | 121 | 38 |
| 2,160 | .43 | 107 | 38 |
| 1,260 (Outside) | .51 | 103 | 36 |

*pounds

TABLE 2

| LOI PROFILE FROM INSIDE TO OUTSIDE OF PACKAGE | | | |
|---|---|---|---|
| FORMULATION EXAMPLE NO. 41 | | FORMULATION EXAMPLE NO. 42 | |
| WEIGHT OF PACKAGE LBS. | % LOI | WEIGHT OF PACKAGE LBS. | % LOI |
| INSIDE | | INSIDE | |
| 27 lbs. | .90 | 17 lbs. | .82 |
| 26 | .94 | 16 | .80 |
| 25 | .97 | 15 | .80 |
| 24 | .98 | 14 | .80 |
| 23 | 1.00 | 13 | .79 |
| 22 | 1.01 | 12 | .82 |
| 21 | 1.01 | 11 | .73 |
| 20 | 1.01 | 10 | .75 |
| 19 | 1.01 | 9 | .80 |
| 18 | 1.02 | 8 | .72 |
| 17 | 1.02 | 7 | .83 |
| 16 | 1.02 | 6 | .85 |
| 15 | 1.02 | 5 | .80 |
| 14 | 1.02 | 4 | .71 |
| 13 | 1.02 | 3 | .73 |
| 12 | 1.02 | 2 | .74 |
| 11 | 1.02 | 1 | .82 |
| 10 | 1.01 | | |
| 9 | 1.01 | OUTSIDE | |
| 8 | 1.01 | | |
| 7 | 1.01 | | |
| 6 | 1.02 | | |
| 5 | 1.03 | | |
| 4 | 1.03 | | |
| 3 | 1.03 | | |
| 2 | 1.02 | | |
| 1 | 1.03 | | |
| OUTSIDE | | | |

The application of the carrier-free sizes of the instant invention will vary in accordance with the particular desires of the user. Where the sizes are instantly mixed, i.e. formed at the point of application, no shelf life considerations are involved. Similarly, where materials are selected such that no reaction is evoked between the coupler and film former, shelf life is not a consideration. For many applications, however, it is necessary that the size formulations exhibit a shelf life of an extent acceptable to conventional industrial practice. With the instant invention, a volatile blocking agent is added to the formulation and driven from the wound package in part by conventional oven heating of relatively short duration. However, no migration phenomena are experienced inasmuch as the volatile blocking agent is added in an amount less than about eight percent. This constituent then vaporizes to a considerable extent in the forming process, one to two percent moisture being present in the "wet" package such that no capillary action takes place to physically drive the size formulation solids from their position of application during the heat drying stage. This maintenance of the deposition integrity of the size is evidenced by the LOI data of Table 2 where Examples 41 and 42 formulations were utilized respectively having an acetone blocking agent present in an amount of four percent by weight and a diacetone alcohol blocking agent in an amount of eight percent by weight.

Looking to Table 3, the effectiveness of acetone and acetic acid as blocking agents for the size formulations of the invention are revealed. Note that the viscosity of the blocking agent-containing formulations remains within acceptable limits for an interval suited to conventional industrial requirements. These data further reveal that both acetone and acetic acid perform acceptably, acetone generally being preferred. The viscosity preferred for coating sizes according to the invention will fall within the range of about 100 to 200 cps at 75° F., however viscosities as high as 2000 cps can be applied.

TABLE 3

VISCOSITIES (cps)

Formulation Example No.

| | Without Blocking Agent | | With Blocking Agent | | | | |
|---|---|---|---|---|---|---|---|
| Day | #32 | #34 | #35 | #33 | #36 | #37 | #42 |
| 0 | 194 | 238 | 65 | 120 | 85 | 100 | 130 |
| 1 | 2,945 | 546 | 125 | 397 | 200 | 370 | |
| 2 | 7,080 | 836 | 140 | — | 250 | 550 | |
| 3 | 8,100 | 950 | 165 | — | 340 | 884 | |
| 4 | — | — | 200 | — | 435 | 884 | |
| 5 | — | — | — | 740 | — | — | |
| 6 | — | — | — | 1,100 | — | — | |
| 7 | 12,340 | 2,072 | — | — | — | — | 196 |
| 8 | 15,120 | 2,028 | — | 1,050 | — | — | |
| 9 | — | — | — | — | — | — | |
| 10 | 23,200 | 2,600 | — | — | — | — | |
| 14 | | | | | | | 240 |
| 21 | | | | | | | 310 |

In the discourse to follow, evidence is provided showing that the size formulations of the invention perform at least equivalently with conventional carrier-containing sizes in all essential applications. This evidence includes a broad range of tests as well as size formulations portions of the data being compiled in conjunction with corresponding tests utilizing an industrially accepted aqueous carrier containing size (about 95% by weight carrier) identified as "Std."

Looking to Table 4, the results of flexural strength, tensile strength and compressive strength testing under ASTM D2150-70 of samples of woven roving laminated within a polyester resin are revealed. The laminates were formed of four layers of woven roving sized with the formulations identified and having 14×14 inch square shape. The layers were impregnated in an unpromoted orthophthalic polyester resin with low styrene content marketed by Owens Corning Fiberglas Co. under the trade designation, "E410". Following impregnation the layers were pressed at a total pressure of 10 p.s.i. to form each sample. The samples were then cut into predetermined shapes for testing. In this regard, the designation, 0°, indicates testing in the weaving machine direction of the fabric, while the designation, 90°, indicates testing in a direction transverse to machine direction. The data reveal that the laminates sized in accordance with the teachings of the invention performed comparably with samples treated with a standard aqueous carrier containing and identified as "Std."

TABLE 4

| Size Formulation Example No. | 26 | Std. | 24 | 27 | Std. |
|---|---|---|---|---|---|
| Flexural Strength psi × 10³ | | | | | |
| Dry 0° | 74.3 | 62.0 | 63.5 | 63.2 | 51.4 |
| Dry 90° | 71.9 | 63.0 | 55.3 | 55.0 | 41.8 |
| Boiled 2 hrs. 0° | 65.0 | 53.8 | 45.2 | 57.7 | 43.5 |
| Boiled 2 hrs. 90° | 70.1 | 54.7 | 41.4 | 48.9 | 39.4 |
| Tensile Strength | | | | | |
| Dry | 44.4 | 46.1 | 41.0 | | |
| Boiled | 38.3 | 42.7 | — | | |
| Compressive Strength | | | | | |
| Dry | 32.6 | 31.9 | 31.1 | | |
| Boiled | 35.9 | 29.7 | — | | |

Another test procedure provides for the fabrication of glass fiber retaining rods which are then tested for flexural strength. To provide the test specimen rods, glass fibers are formed and treated with a selected size. Following this treatment, the fibers are drawn together to form a strand which is coiled into a package and dried as described above. A plurality of these strands of predetermined weight is then immersed within a predetermined resin solution, following which the resin-coated strands are pulled through glass tubing which removes excess resin and shapes the impregnated strands into the form of a rod. The resin forming the rods is then cured for one hour at 235° F. and flexural strength test procedures are carried out. Following preparation, a given number, usually half, of the specimens are boiled for 24 hours prior to testing. Test procedures are carried out under controlled environmental temperature and humidity conditions, the boiled and unboiled specimens being stressed in flexure at predetermined rates by a conventional constant cross-head machine to failure. Tables 5 and 6 provide flexural strength data for rods fabricated utilizing glass fibers treated in accordance with the method of the invention and utilizing the formulations indicated. The rods formed for developing the data were fabricated utilizing a resin provided as a mixture of 100 parts by weight polyester resin marketed under the trade designation "E 701" by Owens Corning Fiberglas Corp., five parts by weight styrene and one part by weight benzoyl peroxide. Additionally, comparative data is provided in the tables wherein rods are identically formed but utilizing glass fibers treated with the above-described standard size (Std.). The data in these tables reveal that specimen rods fabricated utilizing the size formulations of the invention perform comparably with rods fabricated utilizing conventionally-sized glass fibers.

TABLE 5

| Size Formulation Example No. | 27 | 28 | 29 | 30 | Std. | 26* | 39 |
|---|---|---|---|---|---|---|---|
| Flexural Strength | | | | | | | |
| dry, psi × 10³ | 188 | 176 | 175 | 191 | 171 | 239 | 211 |
| boiled, psi × 10³ | 175 | 164 | 162 | 175 | 157 | 207 | 174 |
| LOI percentage | 31.6 | 30.5 | 31.3 | 30.1 | 32.0 | 31 | 36 |

*No oven treatment

TABLE 6

| Size Formulation Example No. | 25 1.1% LOI | 25 2.0% LOI | Std. | 26 0.89% LOI | 26 1.0% LOI |
|---|---|---|---|---|---|
| Flexural Strength psi × 10³ | | | | | |
| dry | 178.5 | 175.9 | 184.1 | 150.7 | 200.2 |
| boiled 24 hours | 157.6 | 155.6 | 154.9 | 167.2 | 177.3 |
| Average Diameter (inches) | 0.146 | 0.146 | 0.146 | 0.149 | 0.148 |
| LOI percentage | 29.29 | 26.33 | 29.71 | | |

Another test utilized in evaluating glass fiber reinforcement is known as the Navel Ordinance Laboratory (NOL) test wherein rings are made according to ASTM specification D-2291 and are tested according to ASTM specification D-2344-72. As in the case of rod specimens, the NOL rings may be formed utilizing a variety of resin binders.

Still another test procedure looks to the tendency for the glass fiber material to form fuzz as described earlier herein. The assignee of the present invention has developed an abrasion test for evaluating the amount of fuzz produced by fibers. This test involves the passing of glass fiber strands through a predetermined number of mutually spaced ceramic eyelets which are arranged such that the strand undergoes directional changes when moving from eyelet to eyelet. Upon passing these contact points, the strand passes through a collection box and then to a metering wheel and to a wrap reel. The amount of fuzz accumulated for a given weight of strand is weighed and reported as the fuzziness of the strand. The test is carried out under controlled environmental conditions.

Referring to Table 7, NOL ring tests data for rings formed with an epoxy amine binder as well as with the above-described polyester binder (E701) are set forth. The table further includes flexural strength data for rod specimens formed with polyester binder as well as fuzz data. These data are compiled for test specimens formed with strand sized with the formulation of example 24 and exhibiting a series of six LOI values as well as for standard "Std." size treated glass fibers. Additionally included in the data is the LOI value for the resin binder as well as a percent retention. The LOI value for resin binder indicates the amount of organic resin burned off the sample, while the percent retention is the ratio of the strength of the boiled specimens (24 hour) to that of the dry specimens. As in the above-described test, the data represented in Table 7 shows that the size treatment of the instant invention produces comparable results with the standard, aqueous carrier containing size. Additionally, it may be noted that the 7-point and 11-point (ceramic rings) values for fuzz production show the size materials of the instant invention to be of acceptable quality. The term "breakout" in the tabulation indicates that the strand speciment laterally breaks and the test is not completed.

Another test serving to evaluate the performance of the size treatment of the invention is identified as ASTM specification D2143 and involves the formation of filament-wound pipe and subsequent cyclic pressurization of the interior thereof with a liquid electrolyte until such time as electrical conductivity is detected through the pipe wall. In general, the pipe is formed by drawing strand from an appropriately size treated package through a resin bath, then through the guide eyes of a filament winding apparatus incorporating a mandrel. Generally, the winding from the guide eyes upon the mandrel is at a helix angle of 54° and the assembly provides a pipe having an inside diameter of 2.235 inches and a wall thickness of 0.075 inches. The resultant filament wound material is cured within an oven, for example at 275° F. for one hour.

TABLE 7

| Size Formulation Example No. 24 | .70% LOI | .51% LOI | .32% LOI | 55% LOI std. |
|---|---|---|---|---|
| E701 PE RODS | | | | |
| Flexural Strength psi × 10³ | | | | |
| Dry | 199.8 | 201.7 | 193.1 | 192.7 |
| Boiled 24 hrs. | 191.6 | 186.7 | 185.8 | 174.9 |
| LOI | 30.9 | 32.1 | 31.2 | 29.5 |
| % Retention | 95.9 | 92.6 | 96.2 | 90.8 |
| E701 RINGS | | | | |
| Ring Shear psi × 10³ | | | | |
| Dry | 9.50 | 9.98 | 10.40 | 9.90 |
| Boiled 24 hrs. | 9.42 | 9.54 | 9.90 | 9.80 |
| LOI | 31.7 | 32.2 | 32.4 | 25.9 |
| % Retention | 99.2 | 95.6 | 95.2 | 99.0 |
| EPOXY AMINE RINGS | | | | |
| Ring Shear psi × 10³ | | | | |
| Dry | 8.36 | 8.42 | 8.80 | 8.65 |
| Boiled 24 hrs. | 8.01 | 7.30 | 8.25 | 7.78 |
| LOI | 26.6 | 24.8 | 23.3 | 20.3 |
| % Retention | 95.8 | 86.7 | 93.8 | 89.9 |
| FUZZ | | | | |
| 7 pt. | | | 5 ± 1.7 | 86.9 ± 44.5 |
| 11 pt. | 35 ± .5 | 45 ± 33 | 31 ± 30 | Break Out |

The weeping of filament wound pipe is believed attributed to a fatigue failure between the laminating resin and the glass fiber reinforcement which evokes cracks in the now unreinforced laminating resin. In order to attain an improvement in this form of cycle to weep test, therefore, either a stronger bond must be produced between the laminating resin and the glass fiber reinforcement or a reduction in the number of broken glass filaments must be provided in the roving. The quality of the size thus plays an important role in achieving improved values for this test, and for the instant purpose, serves as a valuable comparative tool for evaluating the size of the instant invention with size treatments conventionally utilized and generally incorporating aqueous carriers.

Looking in the drawing, curves 10, 12 and 14 represent data developed from the treating of glass fiber reinforced pipes fabricated utilizing a vinyl ester resin marketed by how Chemical Co. under the trade designation "Derakane 411-45". Curve 10 represents data developed from pipes wound with glass fibers sized utilizing the formulation of Example 38, while curves 12 and 14 represent corresponding data developed from pipes wound with glass fiber treated with a standard aqueous carrier containing size. In developing the data, the specimen pipes were stressed as above-described at 25 cpm until weeping terminated each test. Hoop stresses relating medium diameter, pressure asserted and pipe thickness were calculated in accordance with ASTM D1599-69.

It will be apparent that various changes and modifications can be made in the details of procedure, formulation and use without departing from the spirit of the invention, especially as defined in the following claims.

FOOTNOTES

[1] An epoxy resin marketed by Union Carbide Corporation.
[2] Marketed by Union Carbide Corporation and structured as follows:

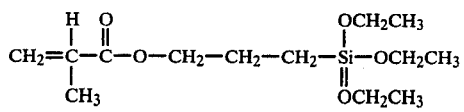

[3] An isophthalic polyester resin marketed by Owens Corning Fiberglas Corporation.
[4] A low reactivity emulsifiable orthophthalic unpromoted, nonthixotropic polyester resin marketed by Owens Corning Fiberglas Corporation.
[5] An amino silane of the following formula:

marketed by Union Carbide Corporation.
[6] Marketed by Arco Chemical Co., Philadelphia, Pa.
[7] Marketed by Hercules Powder Co.
[8] An emulsifiable highly viscous saturated polyester resin marketed by Owens Corning Fiberglas Coporation.
[9] A generally unpolymerized diglycidyl ether of bisphenol A having an E.E.W. of 180–188 and diluted by 12% butyl glycidyl ether and marketed by Dow Chemical Company.
[10] A mineral oil based lubricant marketed by Trylon Corporation, division of Emory Corporation.
[11] Methyl endomethylene tetrahydrophthalic anhydride marketed by Ciba, Corporation.
[12] Polypropylene glycol reacted with ethylene oxide and marketed by Wyandott Chemical Company.
[13] Polypropylene glycol reacted with ethylene oxide and marketed by Wyandott Chemical Company.

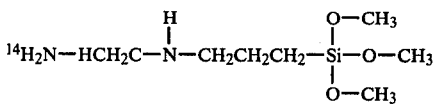

[15] A polyamide amine crosslinker marketed by General Mills Corporation.

16 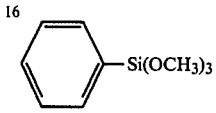

[17] 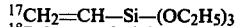
[18] Polymer of diglycidyl ether of Bisphenol A having an E.E.W. of approximately 230–250.

[19] 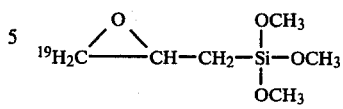

[20] A ke timine catalyst for epoxy resins.
[21] $R-N(CH_2CH_2O)_xH(CH_2CH_2O)_yH$, where: $R=C_nH_{(2n+1)}$, $x+y=15$, the R group is from coconut oil and where: if $n=10$, R is 4%; $n=12$, R is 54%; $n=14$, R is 23%; $n=16$, R is 11%; $n=$ saturated 18, R is 4%; and $n=$ unsaturated 18, R is 4%.

[22] 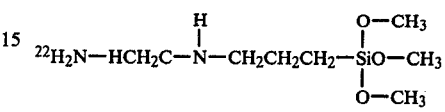

[23] Marketed by Dow Chemical Co., E.E.W.=172–176.
[24] A surfactant functioning as a lubricant and marketed by Rohm and Haas Co., Philadelphia, Pa.
[25] A mineral oil based lubricant marketed by Trylon Corp., division of Emory Corp.

What is claimed is:

1. A size for treating glass fibers comprising:
   from about 5 to about 30 percent by weight of a silane coupler;
   from about 10 to about 65 percent by weight of a lubricant;
   from about 10 to about 70 percent by weight of an epoxy film former; and
   an amount, up to about 8 percent by weight, of a volatile blocking agent sufficient for blocking the reaction of said coupler and said film former;
   said size having a viscosity not greater than 2000 cps and carrier being substantially absent therefrom.

2. The size of claim 1 in which said blocking agent is acetone.

3. The size of claim 1 wherein said size exhibits a viscosity within the range of about 100 to 200 cps at 75° F.

4. The size of claim 1 wherein said coupler is an amino silane.

* * * * *

UNITED STATES PATENT AND TRADEMARK OFFICE
CERTIFICATE OF CORRECTION

PATENT NO. : 4,455,400
DATED : June 19, 1984
INVENTOR(S) : CARL A. JOHNSON

It is certified that error appears in the above-identified patent and that said Letters Patent is hereby corrected as shown below:

In title, first word should read "Migration-Free ...."

Column 8, line 61 should read:
"...... of ethylene oxide"

Column 9, line 13 should read:
"...... of ethylene oxide"

Column 11, line 35 should read:
"...... are removed from the package commencing....."

Column 15, line 7 (in body of Table 6):
"178.5     175.9     184.1     180.7     200.2"

Column 16, line line 53 should read:
"...... marketed by Dow Chemical Co. under the ......"

Signed and Sealed this

Twelfth Day of February 1985

[SEAL]

Attest:

DONALD J. QUIGG

Attesting Officer   Acting Commissioner of Patents and Trademarks